United States Patent
Grandi

(10) Patent No.: US 6,637,320 B2
(45) Date of Patent: Oct. 28, 2003

(54) MODULAR DEVICE FOR THE PRESERVATION AND REHEATING OF TRAY MEALS

(75) Inventor: Vincent Rene Grandi, Campione d'Italia (IT)

(73) Assignee: Italinnova S.A.S. di Grande Rene Vincent, Campione d'Italia (IT)

( * ) Notice: Subject to any disclaimer, the term of this patent is extended or adjusted under 35 U.S.C. 154(b) by 10 days.

(21) Appl. No.: 10/204,603

(22) PCT Filed: Feb. 21, 2001

(86) PCT No.: PCT/IB01/00228
§ 371 (c)(1),
(2), (4) Date: Oct. 8, 2002

(87) PCT Pub. No.: WO01/62131
PCT Pub. Date: Aug. 30, 2001

(65) Prior Publication Data
US 2003/0108647 A1 Jun. 12, 2003

(30) Foreign Application Priority Data
Feb. 24, 2000 (FR) .............................. 00 02366

(51) Int. Cl.⁷ .............................. A23L 1/00; A47J 39/00; A47J 47/00; F25B 29/00; F24J 1/00
(52) U.S. Cl. .............................. 99/468; 99/470; 99/476; 99/483; 62/457.1; 62/371; 165/48.1; 165/919
(58) Field of Search .............................. 99/326–333, 448, 99/449, 416, 417, 467, 468, 470, 473–476, 483, 516; 62/324.3, 382, 457.1, 371, 239, 408, 443, 480; 126/400, 21 A; 165/48.1, 68, 58, 918, 919; 219/214, 218, 386, 406, 521; 312/236, 128, 330.1, 403

(56) References Cited

U.S. PATENT DOCUMENTS 3,160,452 A    12/1964   Rothman
3,205,033 A     9/1965   Stentz
3,908,749 A *   9/1975   Williams ................. 312/236 X
4,052,589 A * 10/1977   Wyatt ........................ 99/448 X
5,159,973 A * 11/1992   Pennington et al. ....... 99/483 X
5,404,935 A *   4/1995   Liebermann ............... 99/470 X
5,449,232 A *   9/1995   Westbrooks, Jr. et al. .................. 165/919 X
5,900,173 A *   5/1999   Robards, Jr. ............... 99/483 X
5,947,012 A *   9/1999   Ewald et al. .............. 99/468 X
5,975,202 A * 11/1999   Grandi ...................... 99/483 X
6,021,709 A *   2/2000   Koopman et al. ........... 99/476
6,034,355 A *   3/2000   Naderi et al. .............. 99/480 X
6,315,039 B1 * 11/2001   Westbrooks, Jr. et al. 99/332 X
6,358,548 B1 *  3/2002   Ewald et al. .............. 99/468 X
6,427,761 B1 *  8/2002   Georges .................... 99/483 X

FOREIGN PATENT DOCUMENTS

| FR | 2662592 | 6/1990 |
| FR | 2759890 | 8/1998 |
| GB | 2293004 A | 3/1996 |
| GB | 2297147 A | 7/1996 |
| WO | 97/09575 | 3/1997 |

* cited by examiner

Primary Examiner—Timothy F. Simone

(57) ABSTRACT

The invention concerns a chamber (1) divided into two zones (11, 12) for preservation at different temperature, separated by a vertical mobile thermal barrier (10), capable of sliding horizontally and enabling said zones (11, 12) to exhibit modifiable dimensions as required. The meal trays (4) comprise, on opposite edges, notches (7) adapted to receive a removable insulating partition (8, 9) separating the meals (13) to be served hot from those to be served cold and whereof the position can be modified to correspond with that of the thermal barrier (10). Vertical sheaths (21) enable, by means of turbines, to circulate warm or cool air, through orifices (22). A valve (23) prevents the air in sheaths (21) from passing through the evaporator (18). Electric resistors (16) with fins are arranged opposite or beneath the meal trays (4). A refrigerating compressor (20, 20'), provided in a lower casing (2) or an upper casing (3), for cool air diffusion and circulation, feed the evaporator (18).

8 Claims, 4 Drawing Sheets

MODULAR DEVICE FOR THE PRESERVATION AND REHEATING OF TRAY MEALS

The subject of the invention is a device for the preservation and reheating of tray meals with modular heat regions and cold regions.

It relates in general to thermally insulated mobile containers consisting of a lower box and an upper box which are separated by a space which can contain several stacked tray meals, and having, passing through the tray meals, two independent circuits, a cooling circuit and a reheating or cooling/reheating circuit, these containers being equipped with refrigeration means communicating with at least one of the two circuits, each tray meal having thermal barriers dividing it into a cold region and a region to be reheated, which are insulated from each other and from the outside, these regions being penetrated by vertical channels ensuring the flow of the hot or cold air.

At the present time, there are a large number of systems intended for tray meals to be stored, transported and reheated.

For example, French patent 2 662 592 discloses a device for distributing tray meals with integrated standby refrigeration effects and reheating effects. It is composed of a compact isothermal module formed by the stacking and superposition of tray meals and of their lids, the whole assembly being positioned in a support cabinet which includes the compressor/heat generator and the ventilation system which allows the refrigerated air to be blown through ducts over the refrigerated region and the standby region which is formed by the superposition of the trays. These two regions are insulated from each other by a deformation of the lid, an electrical resistance element located in each lid allowing the meals to be reheated.

When the support cabinet is moved, in order to distribute the tray meals, the electrical supply for the compressor must be interrupted, thereby excluding any application of this type of cabinet to the distribution these meals from a remote food provision unit since, very rapidly, the evaporator is no longer capable of providing refrigeration.

Another French patent 2 759 890 claims a device for the preservation of tray meals with localized reheating. In this device, the refrigeration means comprise, on the one hand, a cold accumulator, the bottom of which has an approximately semicylindrical deformation, and, on the other hand, against the aforementioned deformation, a regulating member consisting of a horizontal pivoting cylinder, comprising an upper insulating part and a lower conducting part, fitted into which lower conducting part are heat pipe bars projecting into the loop of the cooling circuit and, in one of the elements of each tray, an exchange plate comprising a first heat pipe network, the heat exchangers of which are placed in those regions of the containers to be cooled, this network being provided with heat extraction fittings placed in the descending vertical branch of the cooling circuit.

To our knowledge, no known system can modify on demand the relative size of the hot and cold regions of the tray meals.

The objective of the device according to the present invention is to remedy this situation. This is because it makes it possible for the places intended for the dishes to be consumed cold and the dishes to be consumed hot, respectively, to be adapted according to requirements.

It consists of a chamber for preserving and for reheating tray meals, this chamber being divided into two regions separated by a vertical movable heat barrier which allows said regions to be at different temperatures and to have volumes that can be varied according to requirements, the tray meals having, on two opposed edges, a series of notches housing a removable insulating partition separating the dishes that have to be served hot from the dishes that have to be served cold and the position of said insulating partition may be modified in order to make it correspond with that of the thermal barrier of the chamber.

In the appended drawings, given by way of nonlimiting example, of one of the embodiments of the subject matter of the invention:

Figure 1:
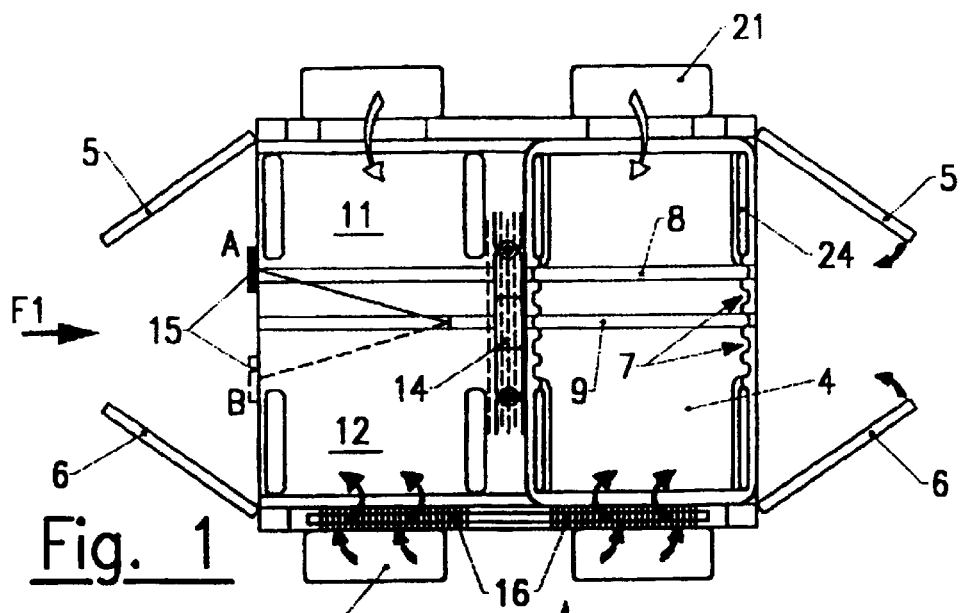
FIG. 1 shows a horizontal section through the space containing the tray meals.

The device (FIGS. 1 to 8) consists of a movable chamber 1 formed from a lower box 2 and from an upper box 3 between which there is a space intended to house tray meals 4 which are preferably placed in two stacks and can be inserted into the chamber or removed therefrom via doors 5, 6 placed on two opposed sides of the chamber 1.

The tray meals 4 have notches 7 for locating an insulating clip-in partition (8, 9) in the required position.

Figure 2:
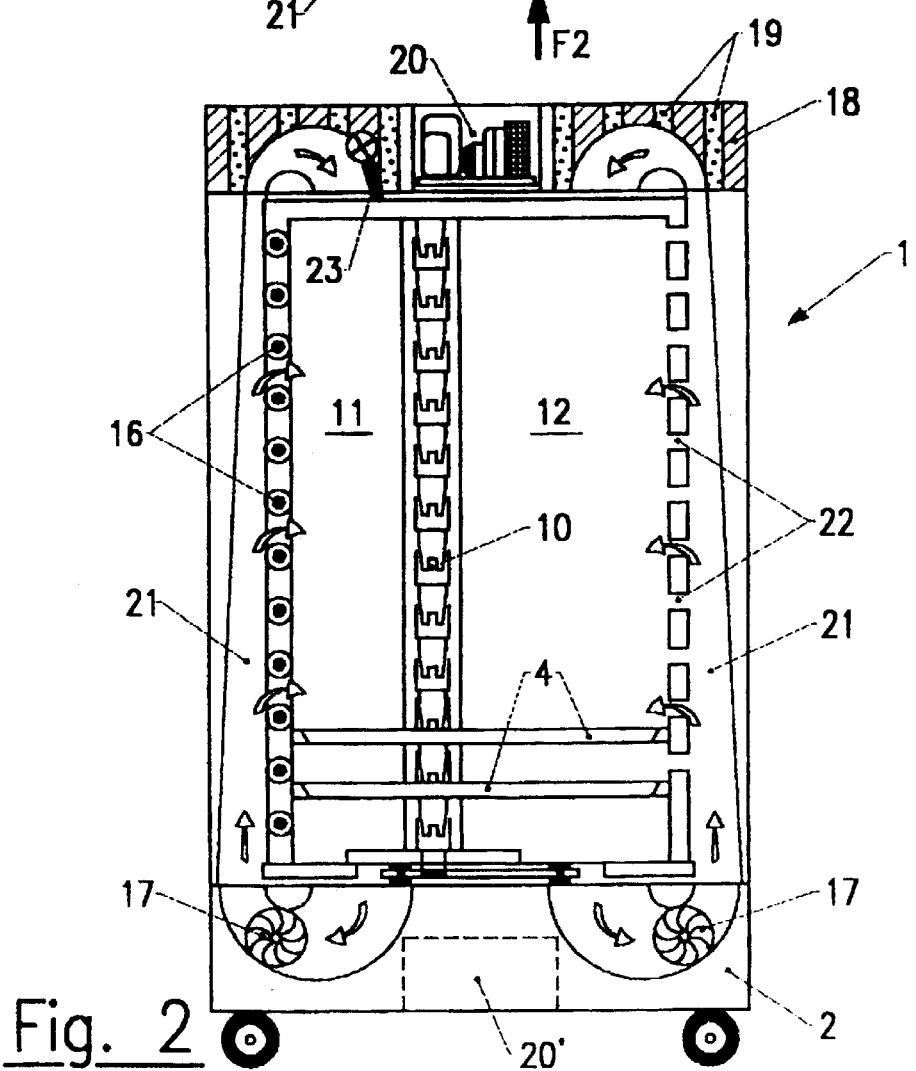
FIG. 2 is a vertical section seen along a direction of the arrow F1 in FIG. 1 through the entire device during a period of preservation, both regions being cooled.
Figure 3:
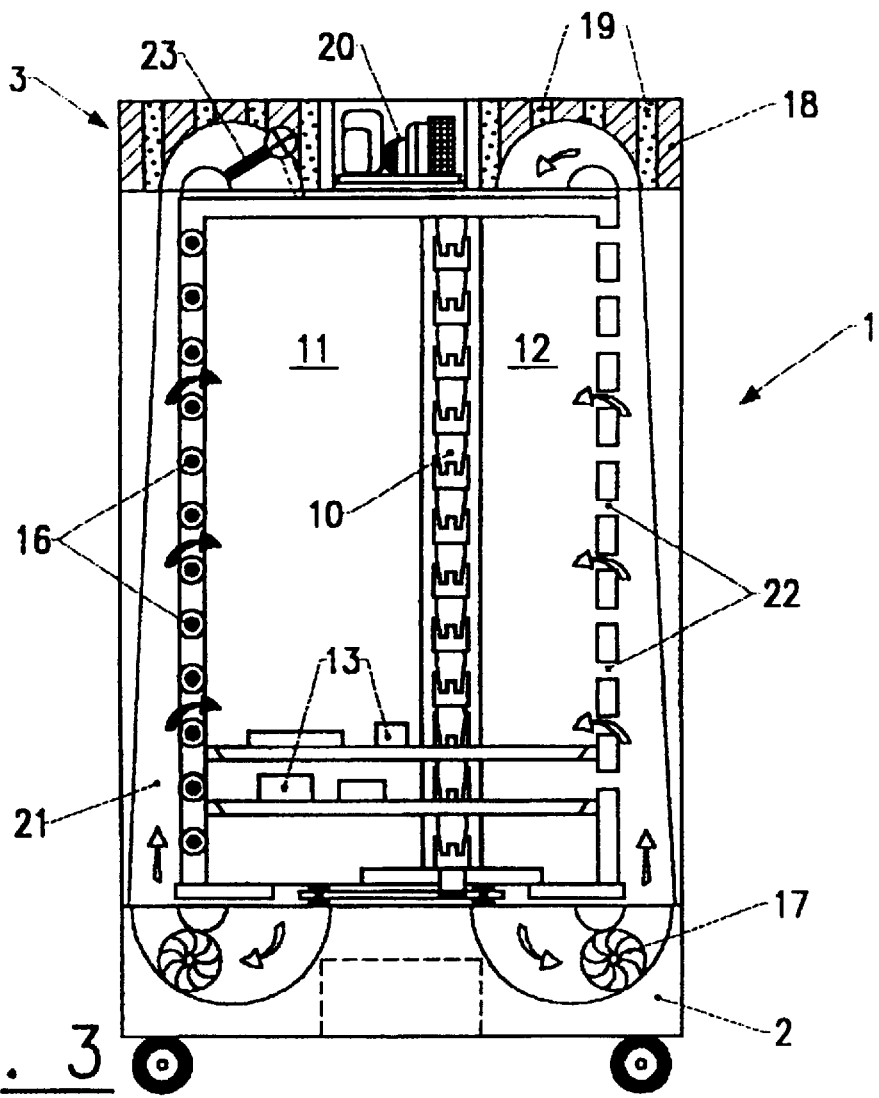
FIG. 3 shows, under the same conditions, the device during a period of reheating the region containing the dishes to be consumed hot.

The chamber 1 includes a vertical movable heat barrier 10 which can slide horizontally so as to be placed in a position corresponding to the chosen location for the insulating partitions 8, 9 (FIGS. 2 and 3). This thermal barrier defines, in the space housing the tray meals, two regions 11, 12 which are thermally separated so as to be able to maintain a low temperature in one of them, while the second is raised to a temperature sufficient to reheat the dishes 13 lying therein (FIG. 3).

The movement of the thermal barrier allows the respective dimensions of the two regions 11, 12 to be modified according to requirements, for example by increasing the size of the hot region 11 in winter and reducing it in summer.

A locking device 14 (FIG. 1) lying between the two stacks of tray meals 4 is locked by a pull cord 15 (A-B). The latter allows the locking device to be unlocked in order to remove the thermal barrier 10 which carries the receptacles for the insulating partitions 8, 9 of the tray meals. This unlocking allows the thermal barrier to be completely removed together with the resistance elements 16 used to reheat one of the regions 11, 12, the whole assembly constituting a removable rack. This being important in order for the device to be thoroughly cleaned.

As in patent No. FR 2 759 890, the cold air is directed by a tangential turbine 17, or any other suitable turbine, into the region 11 or 12. This cold air is produced by one or more evaporators 18 located in the upper box 3 and each having a cold accumulator 19 consisting of a reservoir of glycol, crystals or of any other product capable of storing cold. The evaporator is supplied by a refrigerating compressor 20 operating in background time (for example at night) in order to allow the cold that will be released at the desired time to be stored in the accumulator 19.

The cold accumulator 19 will advantageously consist of an exchanger 28 having fins 29 for the diffusion and circulation of cold air, having tubes 30 for circulation of the refrigerating gas coming from the compressor 20, 20', which tubes are arranged alternately with closed, crimped or soldered, pipes 31 containing a liquid or solid cold-accumulating material such as sodium chloride, glycol, alcohol, antifreeze or the like, this material being cooled when the refrigerating gas is flowing and releases the accumulated heat upon stopping the compressor.

The refrigerating unit 20 may be placed either in the upper box or in the lower box (20').

Located on each side of the chamber are vertical ducts or compression columns 21 allowing the cold air to be compressed by openings 22 in the regions 11 and 12.

Firstly, the cold air penetrates the two regions, over the tray meals 4.

Secondly, during reheating, a valve 23 located in the upper box 3 is closed (FIG. 3) so as to prevent the air from the compression columns 21 of the reheating circuit from passing via the evaporator 18. Finned electrical resistance elements 16 facing the tray meals 4 are actuated and the hot air heats the dishes 13, is then extracted and sucked out by the turbine, returns to the compression column 21 and redescends before being recycled.

Figure 4:
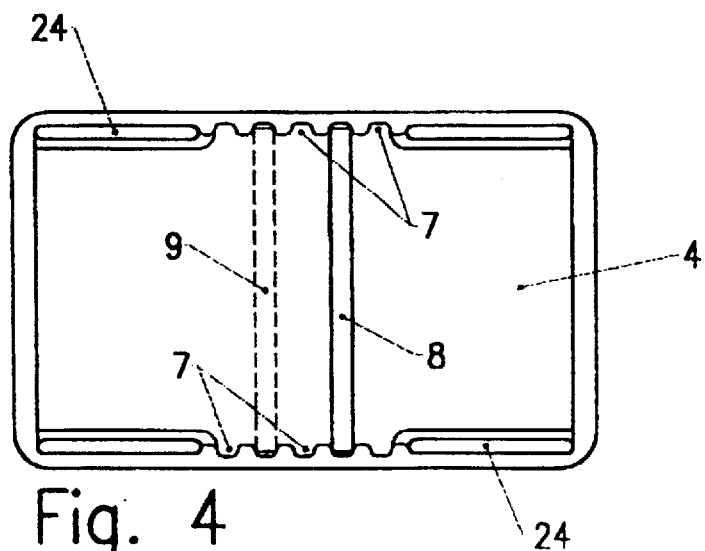
FIG. 4 shows a tray meal enlarged and seen from above.
Figure 5:
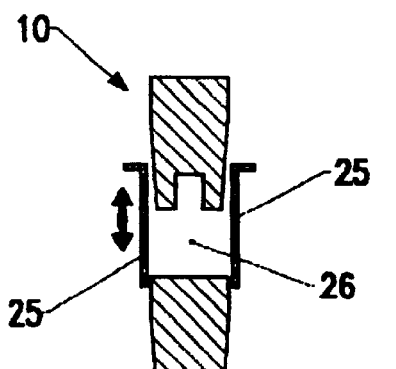
FIG. 5 is a vertical section through the entire device seen along the direction of the arrow F2 in FIG. 1.
Figure 6:
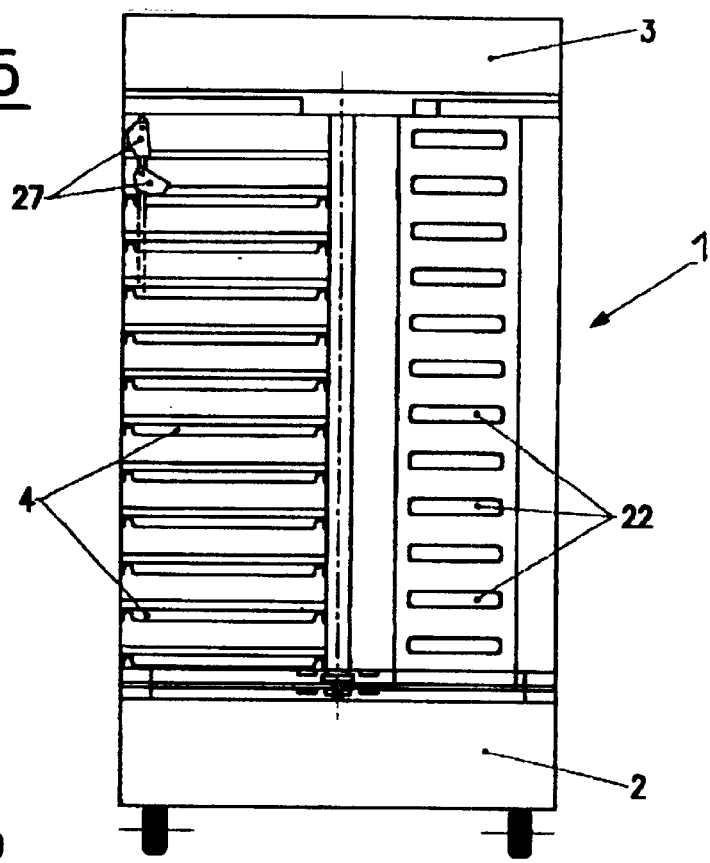
FIGS. 6 and 7 show an element of the thermal barrier with and without the tray meal in position.
Figure 7:
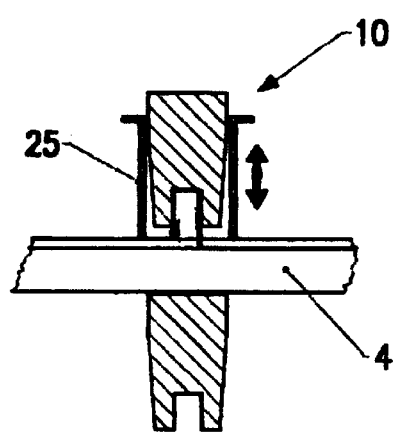
Figure 8:
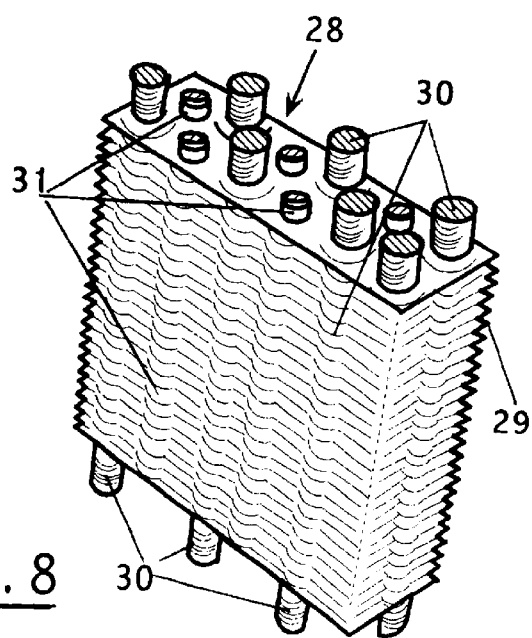
FIG. 8 is an overall view of a finned heat-extraction exchanger and FIGS. 9 and 10 show, seen from above and from the front, the stationary chamber with removal and insertion of a movable trolley carrying the tray meals.

The valve 23 is open when cold and closed when hot. The hot or cold air redescends via orifices 24 provided in the tray meals 4 (FIG. 4).

According to another embodiment, the dishes 13 may also be heated or reheated by resistance elements 16 positioned beneath the meals or trays to be reheated, either by thermal contact or by magnetic field induction.

Slats 25 make it possible, when one of the tray meals 4 is removed, to close off the orifice or slot 26 made in the thermal barrier 10 for slotting in said tray meals. An articulated movable catch 27 causes this slot to open and allows the tray, with the insulating partitions 8, 9, to be slotted into position. The insulating partitions 8, 9 of the tray meals may be easily removed for cleaning, the orifices 24 ensure circulation of the hot or cold air.

The notches 7 allow the insulating partition to be positioned as required.

Figure 9:
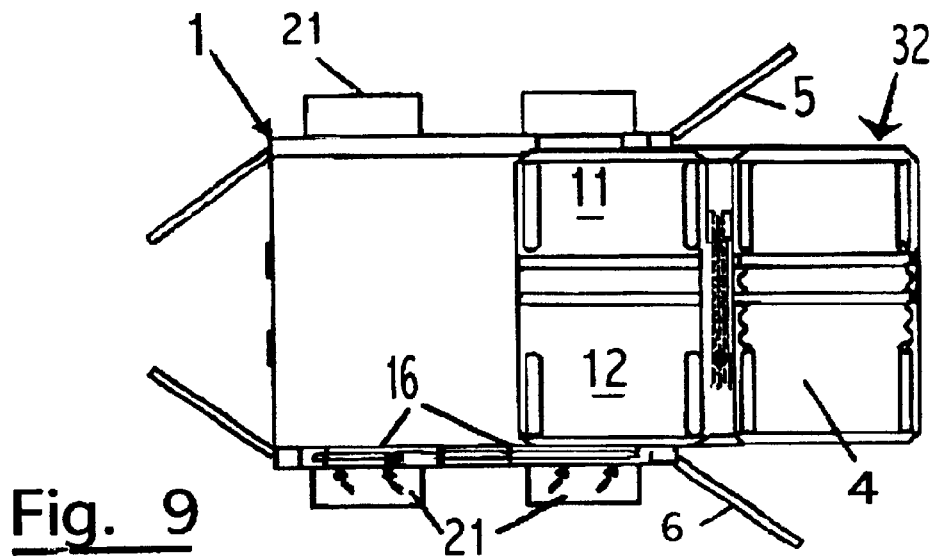
Figure 10:
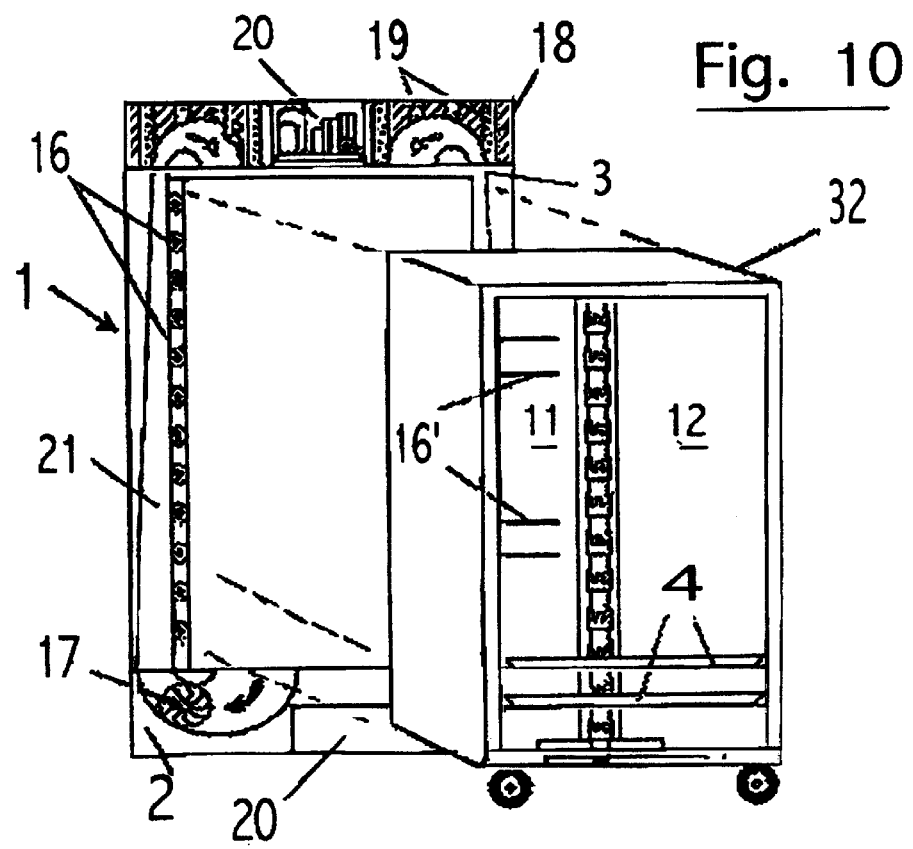

In FIGS. 9 and 10, the chamber 1 is stationary and comprises the compression columns 21, the tangential turbines 17, the refrigerating compressor 20, 20', the evaporator or evaporators 18 with a cold accumulator 19, and the resistance elements 16 used for reheating one of the regions 11, 12, the space between the lower box 2 and the upper box 3 being entirely clear and designed to house a movable trolley 32 carrying the tray meals 4, which tray meals, depending on the heating option chosen, are positioned on a thermal-contact or induction-type resistance element 16'.

The positioning of the various constituent elements confers on the subject of the invention maximum useful effects that hitherto have not been obtained by similar devices.

Just as for the shapes, the dimensions and arrangements of the various elements may be varied while remaining equivalent, as may moreover the materials used, without thereby changing the invention that has just been described.

What is claimed is:

1. A device for the preservation and reheating of tray meals with modular hot and cold regions, which comprises a thermally insulated, stationary or movable, chamber comprising a lower box and an upper box separated by a space able to contain several stacked tray meals and having, passing through these tray meals, two independent circuits, namely a cooling circuit and a reheating or cooling/reheating circuit, wherein the chamber is divided into two regions separated by a vertical movable thermal barrier which can slide horizontally and allows said regions to be at different temperatures and to have dimensions that can be modified according to requirements, the tray meals having, on two opposed edges, notches capable of housing a removable insulating partition separating dishes to be served hot from those to be served cold and a position of said insulating partition may be modified to correspond with that of the thermal barrier.

2. The device as claimed in claim 1, wherein the chamber includes vertical ducts or compression columns making it possible, by means of turbines, to compress hot air or cold air via openings in the regions, this air passing through the tray meals via orifices.

3. The device as claimed in claim 1, wherein cold air is produced by means of a refrigerating compressor placed in the upper box or in the lower box, said compressor supplying at least one evaporator which is located in the upper box and includes a cold accumulator.

4. The device as claimed in claim 1, wherein the reheating circuit includes a valve located in the upper box to prevent, when it is closed, air from compression columns passing via an evaporator, finned electrical resistance elements placed facing the tray meals then making it possible to heat the air, which reheats the dishes, and is then extracted and sucked out by a turbine, returns to the compression column and redescends before being recycled.

5. The device as claimed in claim 1, wherein the thermal barrier, has receptacles for the insulating partitions of the tray meals and resistance elements for reheating one of the regions, comprises a removable assembly that can be removed from the chamber, this assembly being held in place by a locking device locked by a pull cord.

6. The device as claimed in claim 1, wherein the chamber is stationary and comprises compression columns, turbines, a refrigerating compressor, an evaporator or evaporators with a cold accumulator, and resistance elements used for reheating one of the regions or directly under the tray meals, the space between the lower box and the upper box being entirely clear and designed to house a trolley carrying the tray meals.

7. The device as claimed in claim 1, wherein slats make it possible, when one of the tray meals is removed, to close off an orifice or slot made in the thermal barrier for slotting in the tray meals, an articulated movable catch causes this slot to open and allows the tray, with the insulating partitions, to be slotted into position.

8. The device as claimed in claim 1, wherein the tray meals are placed in two stacks and can be inserted into the chamber or removed therefrom via doors placed on two opposed sides of said chamber.

* * * * *